US011216146B2

(12) United States Patent
Cameron et al.

(10) Patent No.: US 11,216,146 B2
(45) Date of Patent: Jan. 4, 2022

(54) MID-FIDELITY SIMULATION APPROACH AND METHOD FOR FLIGHT CREW TRAINING AND EVALUATION

(71) Applicant: The Boeing Company, Chicago, IL (US)

(72) Inventors: Mark Richard Cameron, Dubai (AE);
Nicklas Dahlstrom, Dubai (AE);
Richard James Kennedy, Madrid (ES);
Rosa Maria Rodriguez, Madrid (ES);
Pedro Taboso Ballesteros, Madrid (ES)

(73) Assignee: THE BOEING COMPANY, Chicago, IL (US)

( * ) Notice: Subject to any disclaimer, the term of this patent is extended or adjusted under 35 U.S.C. 154(b) by 321 days.

(21) Appl. No.: 16/275,723

(22) Filed: Feb. 14, 2019

(65) Prior Publication Data

US 2020/0265737 A1 Aug. 20, 2020

(51) Int. Cl.
*G06F 3/0481* (2013.01)
*G09B 9/16* (2006.01)

(52) U.S. Cl.
CPC ............ *G06F 3/0481* (2013.01); *G09B 9/16* (2013.01)

(58) Field of Classification Search
CPC ... G09B 9/00; G09B 9/08; G09B 9/16; G09B 9/165; G09B 9/18; G09B 9/20; G09B 9/203; G09B 9/206; G09B 9/46; G06F 3/0481
See application file for complete search history.

(56) References Cited

U.S. PATENT DOCUMENTS

| 4,673,356 | A | * | 6/1987 | Schmidt | G09B 9/16 434/35 |
| 9,583,019 | B1 | * | 2/2017 | Schwartz | G09B 9/206 |
| 9,583,020 | B1 | * | 2/2017 | Kronfeld | G09B 19/00 |
| 2010/0266994 | A1 | * | 10/2010 | Gregoire | G09B 9/00 434/55 |
| 2017/0210484 | A1 | | 7/2017 | Figard | |

(Continued)

FOREIGN PATENT DOCUMENTS

| EP | 2790168 | | 10/2014 | | |
| EP | 3333782 | A1 * | 6/2018 | ............... | G06N 5/02 |
| IN | 201841028216 | * | 7/2018 | ............... | G09B 9/08 |

OTHER PUBLICATIONS

European Patent Office; Extended European Search Report for Application No. 1921311.8 dated Apr. 3, 2020.

*Primary Examiner* — Mong-Shune Chung
(74) *Attorney, Agent, or Firm* — Parsons Behle & Latimer

(57) ABSTRACT

A system for mid-fidelity simulation may include a memory configured to store data representing a flight scenario. The system may further include a display device configured to present a graphical user interface to a user, the graphical user interface including representations of a first set of control interfaces, the first set of control interfaces including one or more features that are common between multiple aircraft, the graphical user interface omitting one or more features of the first set of control interfaces that are not common between the multiple aircraft. The system may also include a processor configured to perform a simulation of the flight scenario while receiving user input and displaying user output via the representations of the first set of control interfaces.

20 Claims, 14 Drawing Sheets

(56) References Cited

U.S. PATENT DOCUMENTS

2017/0236439 A1* 8/2017 Bowness .................. G09B 5/14
                                                              434/362
2019/0027055 A1   1/2019 Anderson
2019/0304324 A1* 10/2019 Delisle .................. G09B 9/048

* cited by examiner

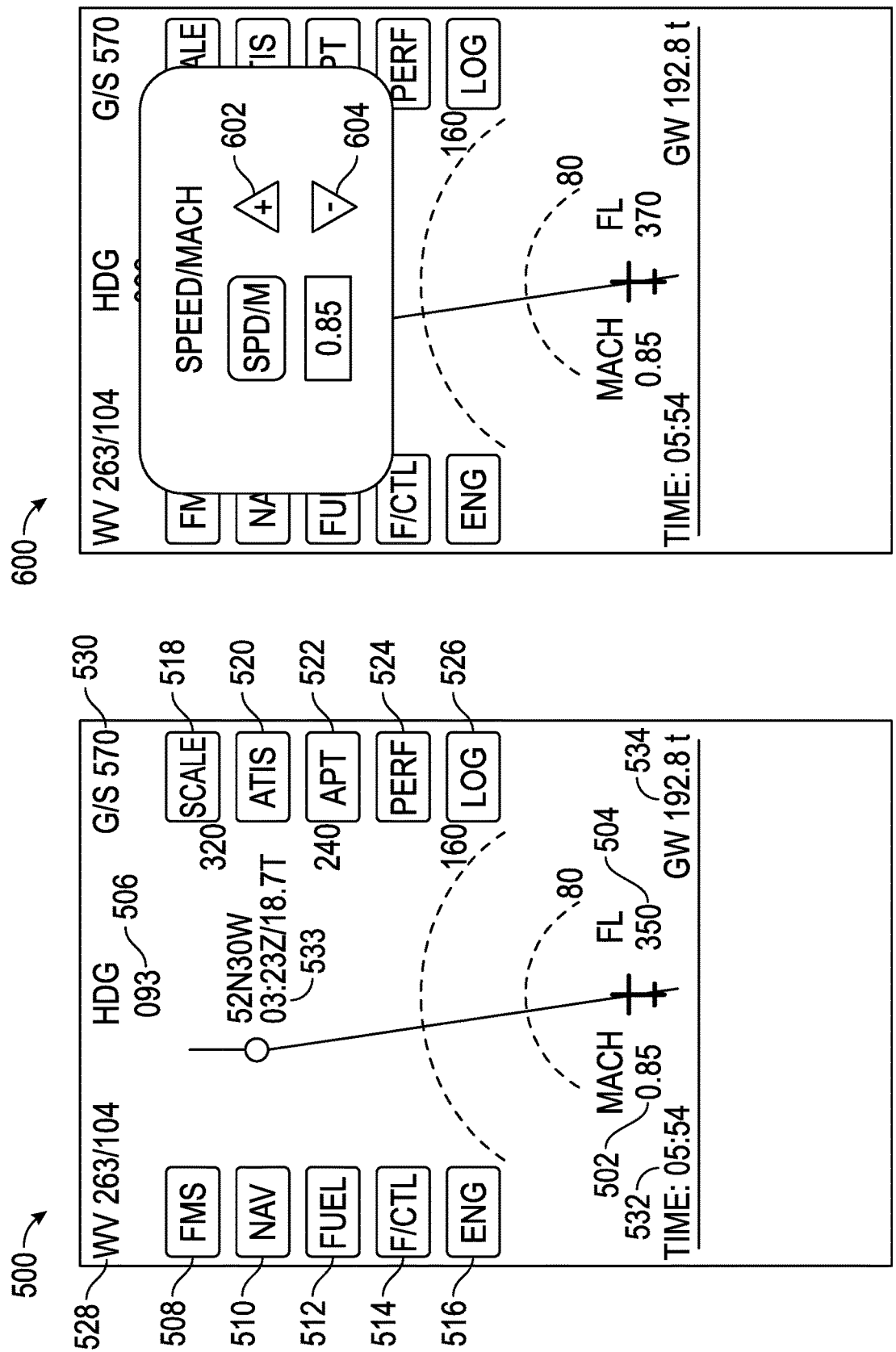

FIG. 9

| WV 263/104 | HDG 093 | | G/S 570 |
|---|---|---|---|
| FMS | | | HOME |
| FROM | ETA | DIST | FUEL |
| 51N40W | -- | -- | 22.3 |
| 52N30W | 06:23 | 280 | 18.7 |
| 52N20W | 07:00 | 366 | 15.5 |
| TOBOR | 07:19 | 183 | 13.8 |
| RILED | 07:23 | 37 | 13.4 |
| DEXEN | 07:57 | 312 | 10.5 |
| EHAM | 08:46 | 1735 | 7.8 |
| TIME: 05:54 | | | GW 192.8 t |

FIG. 10

| WV 263/104 | HDG 093 | | G/S 623 |
|---|---|---|---|
| FMS | | | HOME |
| FROM | ETA | DIST | FUEL |
| 47N40W | -- | -- | 49.6 |
| 50N30W | 06:23 | xxx | 45.7 |
| 51 | FROM-51N20W ▽ | | |
| D | NEXT WPT | | |
| E | | | |
| G | 51N20W    DEL | | |
| E | | | |
| TIME: 05:54 | | | GW 192.8 t |

| WV 263/104 | HDG 093 | G/S 570 |

[ATIS] [HOME]

WEATHER REQUEST [BIKF] [SEND]

1702 — BIKF 0530 INFO ALPHA WIND 020/25 VISIBILITY 800M +RA OVERCAST 500 +05C Q1013. RUNWAY WET. NOTE WINDSHEAR REPORTED IN PREVIOUS HOUR.

TIME: 05:54   GW 192.8 t

| WV 263/104 | HDG 093 | G/S 570 |

[APT] [HOME]

NEAREST AIRPORTS

| | BRG/DIST | ETA | FUEL REM |
|---|---|---|---|
| 1802 — CYQX | 277/676 | 07:39 | 11.5 |
| BIKF | 042/868 | 07:19 | 12.9 |
| LPLA | 162/898 | 07:41 | 11.4 |
| EINN | 091/1048 | 07:39 | 11.5 |
| EIDW | 088/1137 | 07:48 | 10.7 |

TIME: 05:54   GW 192.8 t

WV 263/104    HDG 093    G/S 570

[PERF]   LANDING PERFORMANCE   [HOME]

APT [BIKF ▷] RWY [01 ▷]
WIND [+20 kt ▷] SFC [DRY ▷]
TEMP [+50°C ▷] LWT [190 ▷]
QNH [1013]
FAULTS [NONE ▷]
        NONE
        ONE ENGINE INOPERATIVE

TIME: 05:54      GW 192.8 t

WV 263/104    HDG 093    G/S 570

[PERF]   LANDING PERFORMANCE   [HOME]

RESULTS

REQUIRED LANDING DISTANCE WITH 15% ADDITIONAL FACTOR

2133m

STOP MARGIN 921m

TIME: 05:54      GW 192.8 t

MID-FIDELITY SIMULATION APPROACH AND METHOD FOR FLIGHT CREW TRAINING AND EVALUATION

FIELD OF THE DISCLOSURE

This disclosure is generally related to systems and methods for flight crew training, and in particular, to mid-fidelity simulation for flight crew training.

BACKGROUND

Some of the goals for flight crew training have been recently updated and clarified with focus on specific competencies established by industry standards associations, such as the International Civil Aviation Organization (ICAO). Not only are pilots are expected to be trained in handling and procedural skills, but they should also develop competencies in managing unusual and unexpected situations. This has led to a stronger training focus on crew resource management and non-technical skills and decision making.

Current approaches to recurrent flight crew training and evaluation may include computer-based training, aircraft part task simulation, aircraft fixed-base simulators, and highly sophisticated and realistic full-motion flight simulators. The computer-based training usually involves presenting manuals, checklists, and other document-based information in a digital slide pack. Typically, no simulation is performed. Part-task trainers aid trainees in practicing skills in the operation of specific flight deck systems. However, they fail to provide a full picture of how the aircraft actually functions in given scenarios and cannot realistically simulate interactions between highly-coupled aircraft systems. The fixed-base and full-motion simulators are a good medium for practicing so-called physical maneuvers. However, these simulators cannot evaluate whether the flight crew possess the requisite competencies to manage unusual/non-normal situations or, indeed, whether the flight crew really understand the underlying mechanics of how the aircraft functions. Such understanding is desirable for correct decision-making during flights.

Even when the aforementioned training tools are employed in combination, it is questionable whether they provide a sufficient level of training of the skills and knowledge required for flight crews to operate current fleets of highly integrated commercial airliners. Given the changing profile of the flight crew who are now entering and progressing within the industry, and given the proliferation of new technologies to support learning, it may be beneficial to re-visit the current approaches to current flight crew training. Current simulators may train pilots in the mechanics for piloting particular aircraft, having controls and details unique to the particular aircraft. However, training is limited to particular flight scenarios that may occur regardless of the type of aircraft being piloted. Further, current simulators may have aircraft-specific hardware and software. Which may require multiple training simulators, increasing the overall cost of training. Other disadvantages may exist.

SUMMARY

Disclosed herein is a system and method for providing mid-fidelity simulation that is agnostic in nature, meaning that it is independent from any particular type or aircraft. The term mid-fidelity means that some details regarding specific aircraft controls are omitted while enough details are included to realistically simulate a flight scenario. In an embodiment, a system for mid-fidelity simulation includes a memory configured to store data representing a flight scenario. The system further includes a display device configured to present a graphical user interface to a user, the graphical user interface including representations of a first set of control interfaces, the first set of control interfaces common between multiple aircraft, the graphical user interface omitting one or more features of the first set of control interfaces that are not common between the multiple aircraft. The system also includes a processor configured to perform a simulation of the flight scenario while receiving user input and displaying user output via the representations of the first set of control interfaces.

In some embodiments, the flight scenario includes at least one in-flight event. In some embodiments, the in-flight event includes an aircraft operation event, where the aircraft operation event includes smoke or fire in a cabin of the aircraft, smoke or fire in a cargo hold of the aircraft, depressurization in the cabin of the aircraft, a low fuel warning, a weather advisory warning, or a combination thereof. In some embodiments, the at least one in-flight event includes a script-based event, where the script-based event includes a medical diversion scenario, an unruly passenger scenario, a cabin technical problem scenario, a turbulence scenario, or a combination thereof.

In some embodiments, the processor is configured to monitor the user input during the simulation of the flight scenario and compare the user input to a comparative standard user input, where the display device is configured to present a checklist to the user when the user input does not satisfy the comparative standard user input. In some embodiments, the processor is configured to modify one or more parameters of the flight scenario based on the user input during the simulation of the flight scenario for future simulations. In some embodiments, the processor is configured to determine a state of the simulation after the simulation is completed and compare the state of the simulation to a comparative standard state, where the display device is configured to present a checklist to the user when the state of the simulation does not satisfy the comparative standard state. In some embodiments, the processor is configured to modify one or more parameters of the flight scenario based on the state of the simulation after the simulation is completed for future simulations.

In some embodiments, the processor is configured to determine a training level, wherein the first set of control interfaces is associated with the training level. In some embodiments, the memory is configured to store feedback data regarding the simulation, the feedback data indicating a number of clicks to resolve a problem, time taken to resolve the problem, number of control interfaces explored, or a combination thereof.

In an embodiment, a method for mid-fidelity simulation includes generating a graphical user interface at a processor device, the graphical user interface including representations of a first set of control interfaces, the first set of control interfaces common between multiple aircraft, the graphical user interface omitting features of the first set of control interfaces that are not common between the multiple aircraft. The method further includes performing a simulation of a flight scenario while receiving user input and displaying user output via the representations of the first set of control interfaces.

In some embodiments, the graphical user interface omits a second set of control interfaces, the second set of control interfaces uncommon between the multiple aircraft. In some embodiments, the first set of control interfaces are color coded, having at least a first color denoting control interfaces that are user accessible and at least a second color denoting data calculated during the simulation. In some embodiments, the first set of control interfaces includes a flight management system, a navigation system, a fuel management system, a flight control system, an engine system, or a combination thereof. In some embodiments, the flight scenario includes at least one in-flight event, where the first set of control interfaces are associated with the at least one in-flight event.

In some embodiments, the method includes determining a training level, where the first set of control interfaces is associated with the training level. In some embodiments, the features of the set of the control interfaces that are not common between the multiple aircraft include positions of the first set of control interfaces on a flight deck, shapes of the first set of control interfaces, sizes of the first set of control interfaces, or a combination thereof. In some embodiments, the method includes generating a flight scenario, generating a graphical user interface that includes representations of a first set of control interfaces, the first set of control interfaces common between multiple aircraft, the graphical user interface omitting features of the first set of control interfaces that are not common between the multiple aircraft, and performing a simulation of the flight scenario while receiving user input and displaying user output via the representations of the first set of control interfaces.

In some embodiments, generating a flight scenario includes iteratively performing the simulation and modifying parameters based on feedback data. In some embodiments, the graphical user interface omits a second set of control interfaces, the second set of control interfaces uncommon between the multiple aircraft.

BRIEF DESCRIPTION OF THE DRAWINGS

FIG. 5 depicts an embodiment of a top-level GUI for use with a mid-fidelity simulation.

FIG. 6 depicts an embodiment of a speed/mach change GUI.

FIG. 9 depicts an embodiment of a flight management system GUI.

FIG. 10 depicts an embodiment of a waypoint selection GUI.

FIG. 17 depicts an embodiment of a weather report GUI.

FIG. 18 depicts an embodiment of an airport GUI.

FIG. 19 depicts an embodiment of a landing performance GUI.

FIG. 20 depicts an embodiment of a results display GUI.

Figure 1:
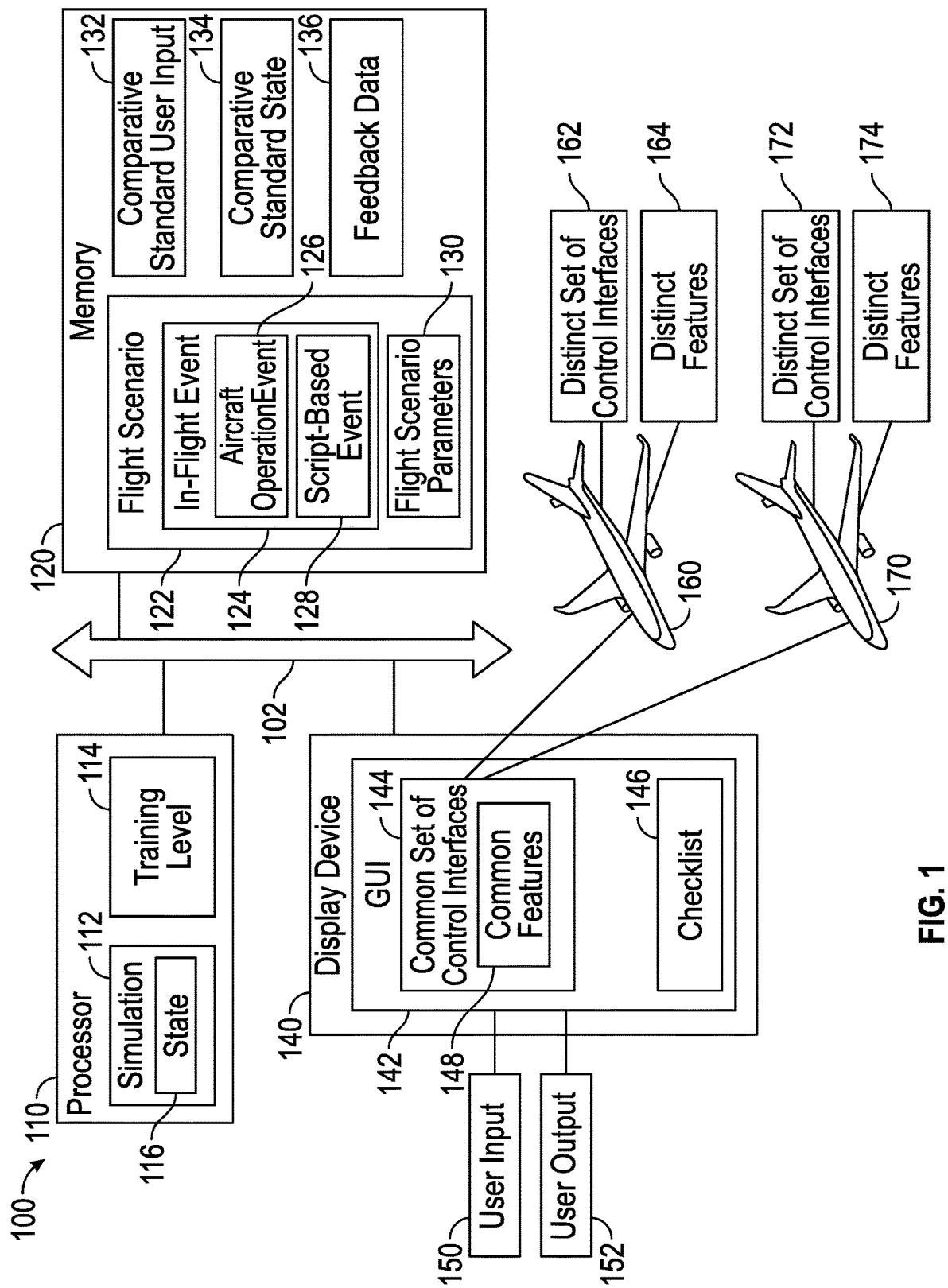
FIG. 1 is a block diagram of an embodiment of a system for mid-fidelity simulation.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the scope of the disclosure.

DETAILED DESCRIPTION

Described herein is an approach and method for the development of operationally-focused mid-fidelity simulation technology for the training and evaluation of non-technical competencies for commercial aviation flight crew. Grown out of research applications for study of human behavior, mid-fidelity simulation delivers training units via operationally specific scenarios which are presented to subjects via an interactive audio-visual system, such as a tablet computer or other mobile device. The scenarios may allow pilots to experience a range of challenging operational situations in the format of simplified simulation. It provides an experience where clear focus on distinct aspects of learning is possible without the distraction of realistic features. Mid-fidelity simulation can be delivered as training in a classroom setting, as supervised training, or as individual training focused on self-learning and development.

Referring to FIG. 1, an embodiment of a system 100 for mid-fidelity simulation is depicted. The system 100 may include a processor 110, a memory 120, and a display device 140. A bus 102 may provide a common communication pathway between components of the system 100. Other communication configurations are possible.

The processor 110 may include a central processing unit (CPU), a graphical processing unit (GPU), a digital signal processor (DSP), a peripheral interface controller (PIC), another type of microprocessor, and/or combinations thereof. The processor 110 may be implemented as integrated circuits, field programmable gate arrays (FPGAs), application specific integrated circuit (ASICs), combinations of logic gate circuitry, other types of digital or analog electrical design components, or combinations thereof. The memory 120 may include memory devices such as random-access memory (RAM), read only memory (ROM), magnetic disk memory, optical disk memory, flash memory, another type of memory capable of storing data and processor instructions, or the like, or combinations thereof.

The processor 110 may be configured to run a simulation 112 of a flight. The simulation 112 may be associated with state information 116, which may include data indicating a state of a simulated aircraft (e.g., position, airspeed, crash status, etc.). The state information 116 may change as the simulation progresses. Certain events, such as a crash, may terminate the simulation 112 and be reflected in the state information 116. Depending on training objectives associated with the simulation 112, the state information 116 may include and/or focus on differing parameters.

The complexity of the simulation 112 may be based on a training level 114 of a user, or of a particular training program. In some cases, the training level 114 may be an indication of progress made by a trainee within a training curriculum, it may be selected by the user before the simulation 112 is performed, and/or it may be determined based on historical data associated with the user and based on desired training objectives. As explained herein, the complexity of the simulation may be reduced in order to omit details in the simulation that are not related to the training level 114 and which may detract from the training objectives. Although depicted as being used by the processor 110, the training level 114 may be stored in the memory 120, or otherwise received through an input/output device, such as the display device 140.

The memory 120 may store data representing a flight scenario 122. The flight scenario 122 may include flight scenario parameters 130 used by the simulation 112 to simulate a flight. The flight scenario parameters 130 may define initial conditions for simulation and an initial state for the simulation 112. The flight scenario 122 may further define at least one in-flight event 124 to be used for training. The at least one in-flight event 124 may include an aircraft operation event 126, a script-based event 128, another type of aircraft event, or combinations thereof. Examples of aircraft operation events include smoke or fire in a cabin of the aircraft, smoke or fire in a cargo hold of the aircraft, depressurization in the cabin of the aircraft, a low fuel warning, a weather advisory warning, other in-flight events related to the operation of an aircraft, or a combination thereof. Examples of script-based events include a medical diversion scenario, an unruly passenger scenario, a cabin technical problem scenario, a turbulence scenario, another type of event that may occur during a flight, or a combination thereof. The in-flight event 124 may be delayed during the simulation 112 and, in some cases, may not be known to a user of the system 100, thereby enabling the user to train and/or practicing diagnosing and resolving the in-flight event 124.

The display device 140 may be configured to display a GUI 142. The GUI 142 may be a mid-fidelity GUI and may be agnostic to any particular aircraft. As such, the GUI 142 may include representations of a set of common control interfaces 144. The set of common control interfaces 144 may be common between multiple aircraft, such as a first aircraft 160 and a second aircraft 170. The first aircraft 160 and the second aircraft 170 may also have distinct sets of control interfaces 162, 172 that are unique to each of the aircraft 160, 170. The GUI 142 may omit the distinct sets of control interfaces 162, 172. By omitting the distinct sets of control interfaces 162, 172, the system 100 may be used for situational training, applicable to multiple types of aircraft, instead of training for a single type of aircraft.

Further, each of the set of common control interfaces 144 may include common features 148 that are the same between the aircraft 160, 170. Each aircraft 160, 170 may also include distinct features 164, 174 that are not common between the aircraft 160, 170. Examples of the common features 148 and distinct features 164, 174 may include positions of control interfaces on a flight deck, shapes of the control interfaces, sizes of the control interfaces, and other properties associated with the control interfaces. The GUI 142 may omit one or more of the distinct features 164, 174 that are not common between the aircraft 160, 170. In that way, the GUI 142 may be agnostic to any particular type of aircraft, thereby preventing potential distraction for a trainee based on finding a position, size, or shape of a particular control interface of the set of common control interfaces 144 on an instrument panel associated with a particular aircraft (e.g., either the aircraft 160 or the aircraft 170).

User input 150 may be received and user output 152 may be displayed to a user of the system 100 via the set of common control interfaces 144 of the GUI 142. The user input 150 may be received during the simulation 112 to control a simulated flight. The user output 152 may be displayed to a user via the set of common control interfaces 144 to provide information to the user about the simulated flight. Examples of the user input 150 and user output 152 are further described herein with reference to the GUIs depicted in FIG. 5-21.

During the simulation 112, the user input 150 may be monitored by the processor 110 and compared to a comparative standard user input 132, which may be stored at the memory 120. For example, if a suitable approach to resolving the in-flight event 124 includes setting at least one control interface of the set of common control interfaces 144 to a particular value, or range of values, the comparative standard user input 132 may include that value, or range of values. The actual value set by the user may be compared to the value, or range of values, stored as the comparative standard user input 132 to determine whether the user properly resolved the in-flight event 124. Other examples of comparative standard user input 132 may include, combinations of input, timing of input, other types of measurable and comparable input, and combinations thereof. If the user input 150 does not satisfy the comparative standard user input 132, e.g., falls outside a range of acceptable values, then the display device may be configured to display a checklist 146 to the user to refresh the user's memory in dealing with the in-flight event 124.

The user input 150 may also be used to modify and improve the simulation 112 for future training. For example, one or more parameters of the flight scenario parameters 130 may be modified based on the user input 150 and based on a determination of the effectiveness of the user input 150 in resolving the in-flight event 124. In some cases, the modified flight scenario parameters 130 may be sent to a central repository (not shown) to improve training globally within a training program.

Likewise, the memory 120 may include a comparative standard state 134 of the simulation 112. For example, if resolving the in-flight event 124 includes putting the simulation 112 into a state information 116 that corresponds to a particular position, airspeed, crash status, etc., then one or more of those parameters of the state information 116 of the simulation may be compared to corresponding parameters, or value ranges, of the comparative standard state 134 to determine whether the in-flight event 124 has been properly resolved. The processor 110 may be configured to monitor the user input 150 during the simulation 112 of the flight scenario 122 and compare the user input 150 to the comparative standard state 134. The display device 140 may be used to present the checklist 146 to the user when the user input 150 does not satisfy the comparative standard state 134. As with the user input 150, one or more parameters of the flight scenario parameters 130 may be modified based on the state information 116 of the simulation 112 after the simulation 112 is completed.

The memory 120 may further store feedback data 136. The feedback data 136 may include information indicating, for example, a number of clicks to resolve a problem, time taken to resolve the problem, number of control interfaces explored, or a combination thereof. In order to improve the simulation 112, the simulation 112 may be iteratively performed while the flight scenario parameters 130 are modified based on the feedback data 136. In this way, the simulation 112 may be dynamically improved.

A benefit of the system 100 is that training may be performed in an aircraft agnostic way, without distracting trainees with control interfaces and distinct features that are only applicable to a subset of aircraft. Rather, the focus of the simulation 112 can be on the flight scenario 122 independent of any particular type of aircraft. Further, the system 100 may be applied flexibly in many different training contexts without the need for specialist hardware and software to be deployed. Therefore, the system 100 provides a strong cost-benefit advantage when compared with higher fidelity simulation technology. Other advantages may exist.

Figure 2:
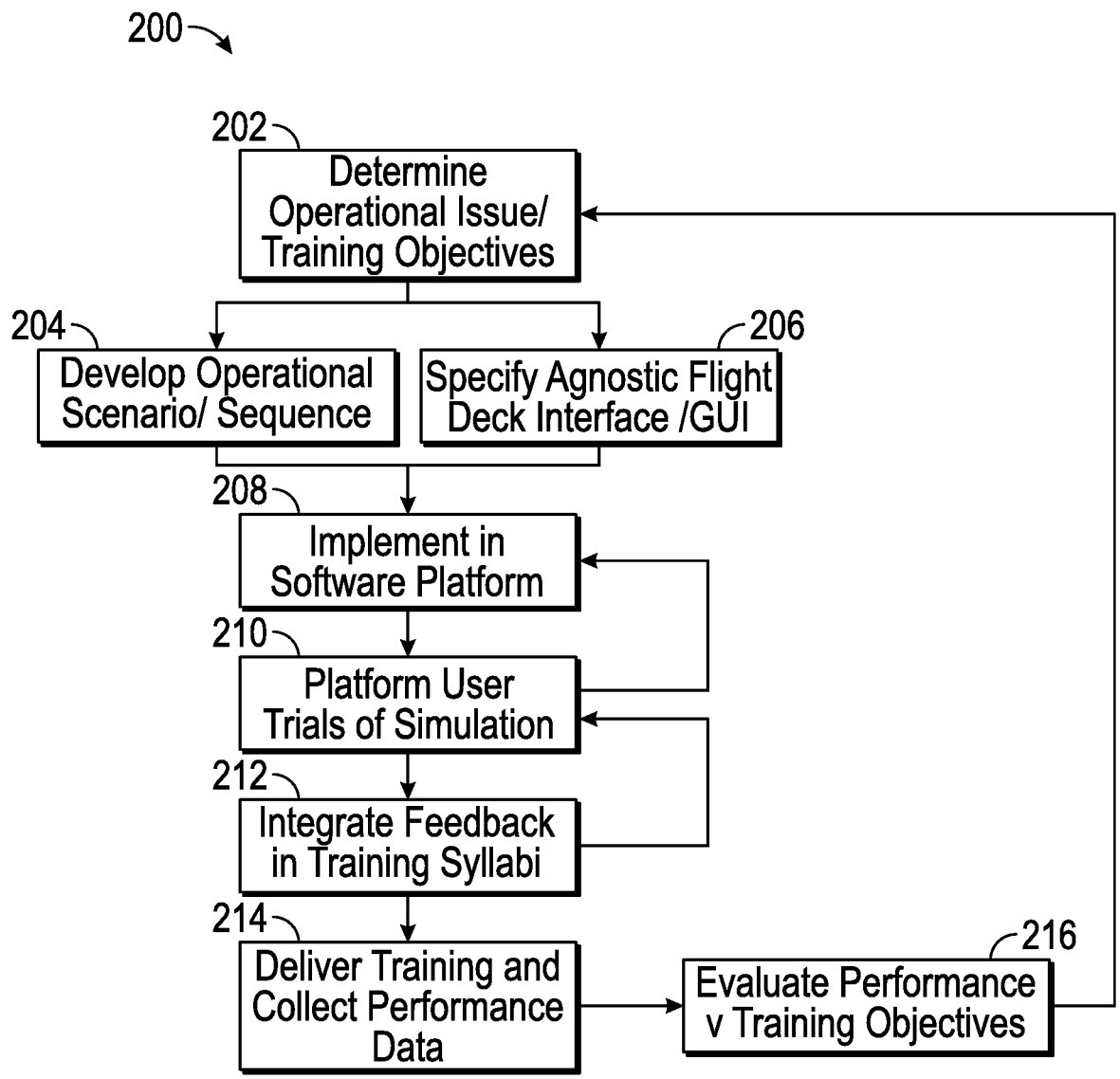
FIG. 2 is a flow diagram depicting an embodiment of a method for developing a mid-fidelity simulation.

Referring to FIG. 2, an embodiment of a method 200 for developing a mid-fidelity simulation is depicted. The method 200 may include determining an operation issue or training objective, at 202. In some cases, the data for determining the operational issue or training objective may be sourced from flight operations. For example, incident or accident data, flight monitoring data, line operations safety audits, flight check data, surveys, and/or internal reports may be relied on to identify common issues for which pilot training is desirable. Based on the issue, a training objective for a particular training simulation may be determined. Further, the operation issue or training objective can also be determined based on feedback from within a training program as feedback.

The method 200 may further include developing an operational scenario or sequence, at 204. For example, the flight scenario 122 may be developed. The flight scenario 122 may include the aircraft operation event 126 and/or the script-based event 128. The effects of the events 126, 128 on the set of common control interfaces 144 may be considered during the programming of the simulation 112. Input from operations experts and/or pilots may also be considered to ensure that scenarios are realistic.

Simultaneous with developing the operational scenario or sequence, the method 200 may also include specifying an agnostic flight deck interface or GUI, at 206. For example, the GUI 142 may be designed to include a set of common control interfaces 144 that correspond to (e.g., affect or are affected by) the flight scenario 122. Unrelated control interfaces may be omitted in order to prevent distraction to trainees that may be caused by superfluous control interfaces that are unnecessary to resolve the in-flight event 124.

The method 200 may include implementing the simulation and GUI in a software platform, at 208. For example, the simulation and GUI may be implemented in a versatile and transferrable software platform, such as hypertext transfer markup language 5 (HTML5), Javascript, etc.

The method 200 may further include performing user trials of the simulation, at 210. For example, the simulation 112 may be performed several times with experienced users providing the user input 150. Based on the feedback data 136 received from these trial runs and based on other feedback that may be provided by the users, changes to the implementation of the software may be reperformed, at 208, and/or the operational scenario or sequence may be integrated into a mid-fidelity simulation training syllabus at step 212. For example, the flight scenario 122 may be part of a set of flight scenarios designed to train pilots in a systematic and progressive manner. Further, in some cases, the feedback data 136 gathered during the simulation 112 may be used to iteratively alter the flight scenario 122 in order to improve the training received by users and additional user trials may be reperformed at 210.

The method 200 may also include delivering training to users and collecting performance data, at 214, and evaluating performance in view of the training objectives, at 216.

For example, the mid-fidelity simulations may be performed by multiple users for training and the feedback data 136 may be collected. The feedback data 136 may be objective (e.g. clicks required to resolve the in-flight event 124, time taken, number of mid-fidelity simulation functions explored, etc.) and subjective (e.g., Have you learned something new from using the mid-fidelity simulation? Did you find it an effective way to understand the issue? Can you deploy what you learned in actual flight operations?). This feedback may be used to determine whether the mid-fidelity simulation has been a suitable means to address the training objectives or needs that were previously defined.

Figure 3:
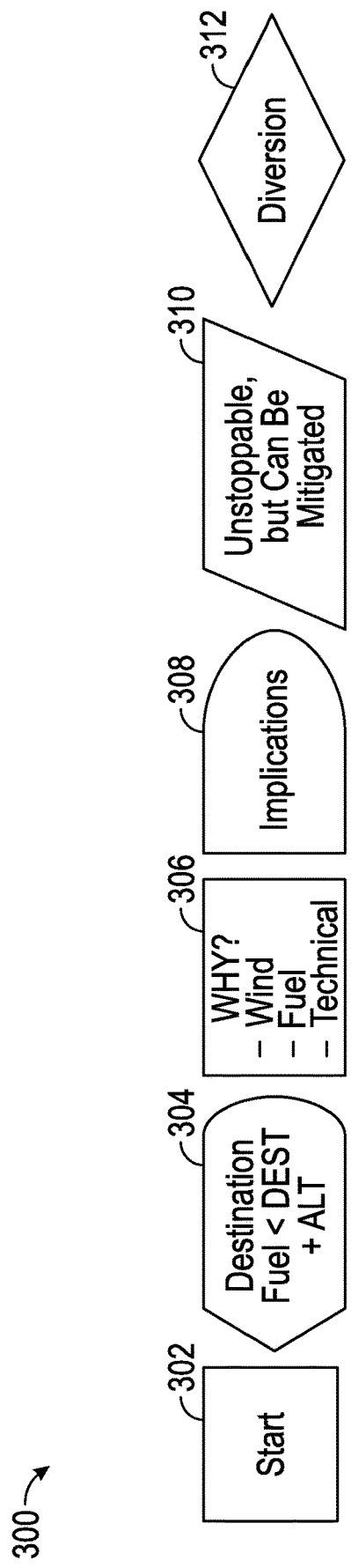
FIG. 3 is a diagram depicting an embodiment of an operational scenario.

Referring to FIG. 3, an embodiment of an operational scenario 300 is depicted. The operational scenario 300 may start at 302. For a brief period of time, the scenario 300 may function as a normal flight. During this time, a user may have the opportunity to explore a GUI and various control interfaces to familiarize the user with the GUI and with the initial conditions of a flight scenario.

After the period of time (e.g., 2 minutes), the user may receive an advisory on a scratch pad control interface of the GUI, at 304. The advisory may inform the user of a simulated issue associated an in-flight event. As a non-limiting example, in the embodiment depicted, the advisory may indicate that an estimated achievable distance based on an amount of fuel is less than the distance to an aircraft's destination.

The user may then explore the GUI, at 306. The GUI may include control interfaces to enable the user to diagnose the situation, including determining any contribution of factors, such as wind speed, fuel amounts, and technical issues, that may be causing the advisory. For example, secondary indications of a fuel imbalance may be found in sub-portions of the GUI.

The user may then consider the implications of the advisory, at 308. In some cases, this consideration may be guided by a checklist, which may be displayed at the display device 140. For example, the user may be guided to determine whether a destination may be reached regardless of the advisory.

In the example scenario of FIG. 3, it may be determined that missing the destination due to a fuel imbalance is unstoppable, at 310. However, the problem may be mitigated. For example, the user may use the GUI to increase or reduce speed, change altitude or course, or determine an alternative airport.

At 312, a decision may be made whether and where to divert the aircraft. The decision may be made based on information retrieved from the GUI. For example, a user may learn that a tailwind prevents return. Weather information may be available indicating that some alternative airports may be out of range. Further, airport information may be available indicating whether runways are closed or sufficient for an aircraft. While FIG. 3 depicts one example of an operational scenario 300, other scenarios are possible.

Figure 4:
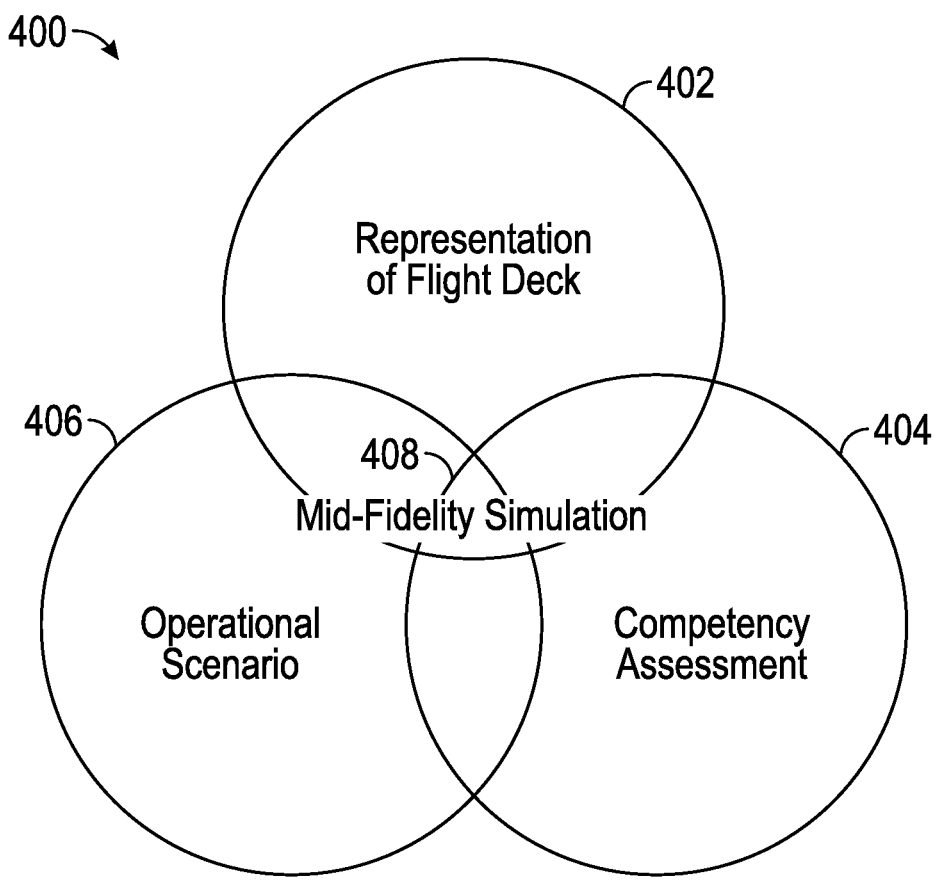
FIG. 4 is a conceptual diagram depicting an embodiment of design elements for consideration in designing an agnostic graphical user interface (GUI).

Referring to FIG. 4, a diagram 400 depicting an interaction between design elements in forming an agnostic flight deck GUI for use with a mid-fidelity simulation, such as the GUI 142 of the system 100. The design elements may include: a representation of a flight deck, as represented by the area 402, an operational scenario, as represented by the area 406, and a competency assessment, as represented by the area 404. The resulting GUI may include only those control interfaces and features that are associated with each of these three elements, as depicted conceptually by the area 408.

The flight deck GUI for the mid-fidelity simulation may be at a level of abstraction that realistically represents both the flight deck functionality and how a pilot would operate and interact with flight deck systems in a real-world situation. Basic functions may include a flight management system, a navigation system, a fuel management system, a flight control system, and an engine system. Supporting functions may include the ability to scale a primary flight display and an automatic terminal information service (ATIS).

The operational scenario (corresponding to the area 406) may be the focus of the training and evaluation exercise. The types of in-flight events that could be reflected in the operational scenario may include, for example, smoke in the cockpit, a cargo-hold fire, depressurization, fuel problems, aircraft diversion, and weather issues.

The specific competencies to be addressed and the evidence-based indicators associated with these competencies may differ depending on the application and desired training level. Various underlying frameworks could be deployed. In an example, the competency assessment may reflect the ICAO core competencies. Other applications are possible.

The mid-fidelity simulation may incorporate elements of simulation that intersect at each of the areas 402, 404, 406. Other features and aspects may be omitted.

FIGS. 5-21 depict various GUIs that may individually or collectively correspond to the GUI 142. As described in FIG. 4, the GUIs depicted in FIGS. 5-21 may be agnostic to any particular aircraft while realistically representing flight deck functionality. As such, the GUIs depicted in FIGS. 5-21 may include a set of control interfaces that are common to multiple aircraft, while omitting features (e.g. positions, sizes, shapes) of the control interfaces that are not common between the aircraft.

Further, the control interfaces described with reference to FIGS. 5-21 may be color coded. For example, a first color may denote control interfaces that are user accessible or editable. A second color may denote data calculated during the simulation that is not editable. Other colors may have other meanings. In a non-limiting exemplary embodiment, white may denote a value that is changeable through the GUI, green may denote data that is calculated by the system, magenta may denote navigation data that is calculated by the system, amber may denote a home or top level access button, red may denote a safety critical issue, and blue may denote a system message.

Referring to FIG. 5, an embodiment of a top-level GUI 500 for use with a mid-fidelity simulation is depicted. The top-level GUI 500 may include multiple control interface, such as a selectable speed indicator 502, a selectable flight level indicator 504, and a selectable heading indicator 506. Further, on a left side of the top-level GUI 500, the top-level GUI 500 may include a flight management system button 508, a navigation button 510, a fuel system button 512, a flight controls button 514, and an engine button 516. On a right side of the top-level GUI 500, the top-level GUI 500 may include a scale button 518, an ATIS button 520, an airport button 522, a landing performance button 524, and a log button 526. Each of these control interfaces may be white to denote that a user may access and/or alter the data.

The top-level GUI 500 may further include various calculated values, such as a wind velocity indicator 528, a ground speed indicator 530, a time indicator 532, and a gross weight indicator 534. Each of these control interfaces may be green to denote that they are calculated values. The top-level GUI 500 may further include a navigation data indicator 533, which may be magenta.

Referring to FIG. 6, an embodiment of a speed/mach change GUI 600 is depicted. The speed/mach change GUI 600 may be displayed over, or on top of, the top-level GUI 500 in response to selection of the selectable speed indicator 502. Controls 602, 604 may be displayed to enable a user to alter a speed of the simulated aircraft.

Figure 7:
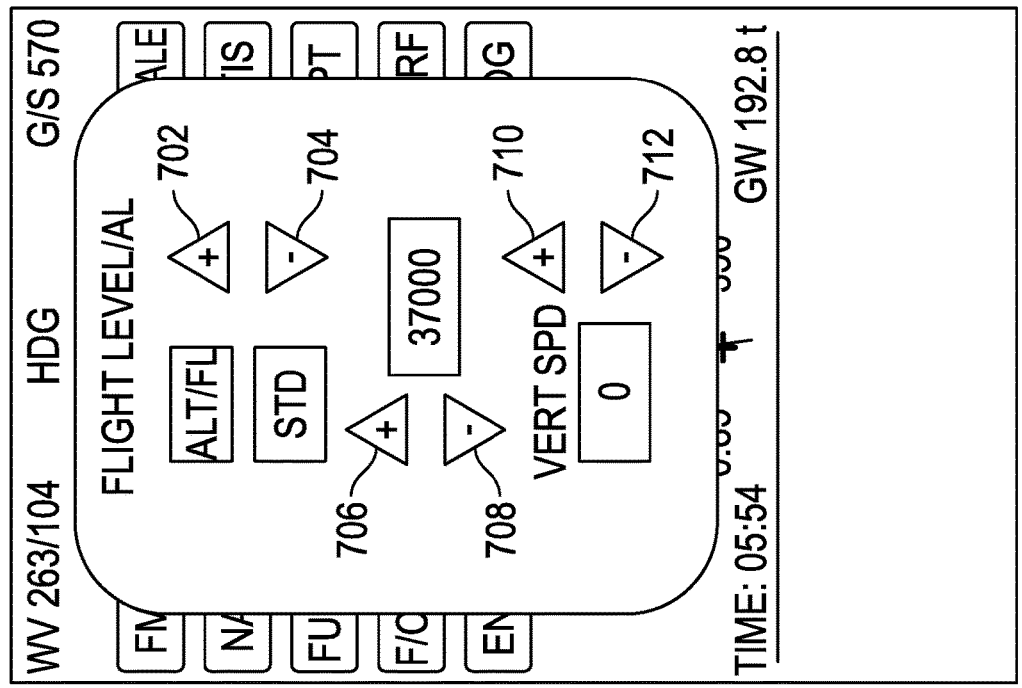
FIG. 7 depicts an embodiment of a flight level change GUI.

Referring to FIG. 7, an embodiment of a flight level change GUI 700 is depicted. The flight level change GUI 700 may be displayed over, or on top of, the top-level GUI 500 in response to selection of the selectable flight level indicator 504. A first set of controls 702, 704 may enable a user to change a type of level calculation, a second set of controls 706, 708 may enable a user to change an altitude of the simulated aircraft, and a third set of controls 710, 712 may enable a user to change a vertical speed of the simulated aircraft.

Figure 8:
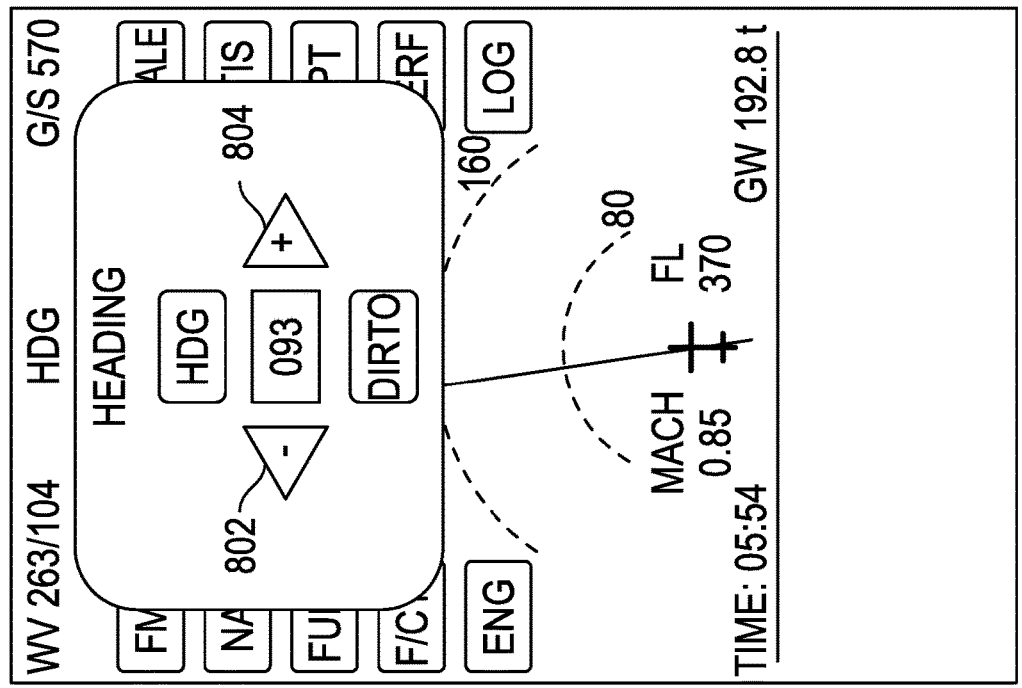
FIG. 8 depicts an embodiment of a heading-change GUI.

Referring to FIG. 8, an embodiment of a heading change GUI 800 is depicted. The heading change GUI 800 may be displayed over, or on top of, the top-level GUI 500 in response to selection of the selectable heading indicator 506. A set of controls 802, 804 may be displayed to enable a user to alter a heading of the simulated aircraft.

Referring to FIG. 9, an embodiment of a flight management system GUI 900 is depicted. The flight management system GUI 900 may be displayed in response to selection of the flight management system button 508. The flight management system GUI 900 may include one or more selectable waypoint indicators 902, among other features as depicted.

Referring to FIG. 10, an embodiment of a waypoint selection GUI 1000 is depicted. The waypoint selection GUI 1000 may be displayed over, or on top of, the flight management system GUI 900 in response to selection of one of the selectable waypoint indicators 902. The waypoint selection GUI 1000 may enable a user to select one or more waypoints for a simulated flight.

Figure 11:
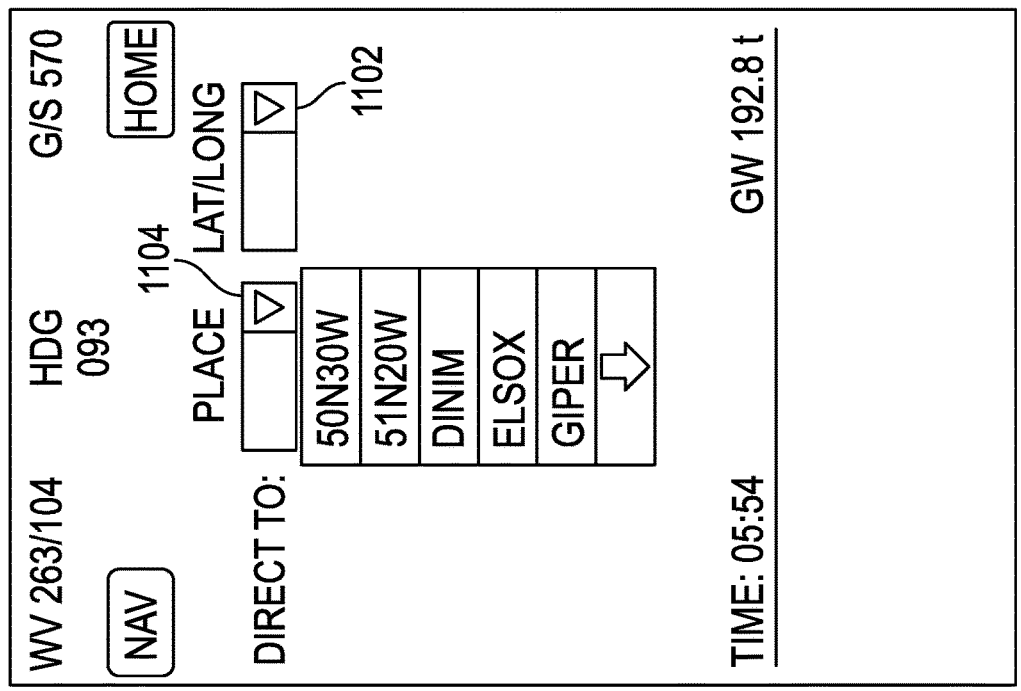
FIG. 11 depicts an embodiment of a navigation GUI.

Referring to FIG. 11, an embodiment of a navigation GUI 1100 is depicted. The navigation GUI 1100 may be displayed in response to selection of the navigation button 510. The navigation GUI 1100 may include a place dropdown button 1104 and a latitude/longitude dropdown button 1102 to enable selection of a navigation target.

Figure 12:
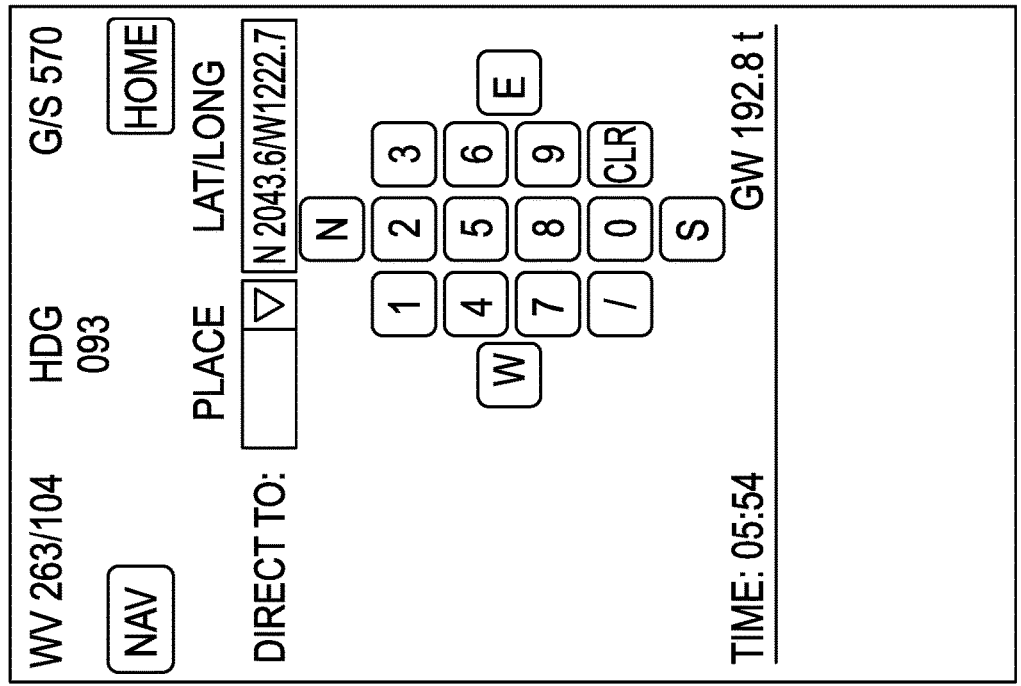
FIG. 12 depicts an embodiment of a data entry soft keyboard GUI.

Referring to FIG. 12, an embodiment of a data entry soft keyboard GUI 1200 is depicted. The data entry soft keyboard may be displayed over, or on top of, the navigation GUI 1100 in response to selection of the latitude/longitude dropdown button 1102 to enable entry of a latitude and longitude.

Figure 13:
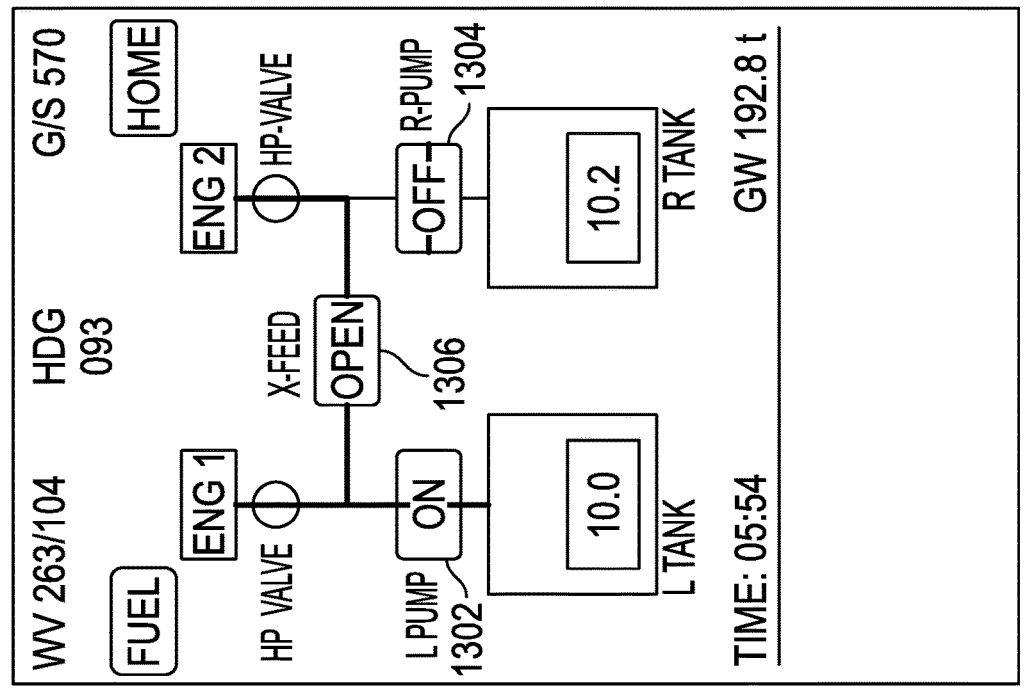
FIG. 13 depicts an embodiment of a fuel system GUI.

Referring to FIG. 13, an embodiment of a fuel system GUI 1300 is depicted. The fuel system GUI 1300 may be displayed in response to selection of the fuel system button 512. A set of pump controls 1302, 1304 may enable a user to activate or deactivate fuel pumps associated with a simulated aircraft. Further, a cross-feed control 1306 may enable a user to reconfigure fuel tank sources. Other features may also exist as illustrated in FIG. 13.

Figure 14:
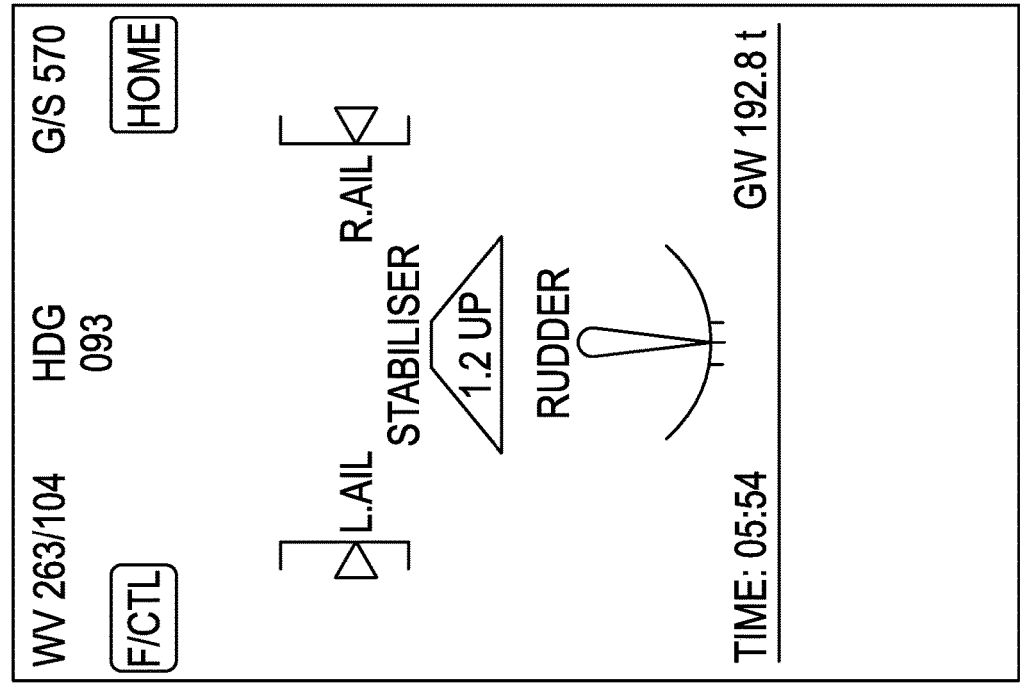
FIG. 14 depicts an embodiment of a flight controls GUI.

Referring to FIG. 14, an embodiment of a flight controls GUI 1400 is depicted. The flight controls GUI 1400 may be displayed in response to selection of the flight controls button 514. The flight controls GUI 1400 may enable a user to manually control a simulated aircraft.

Figure 15:
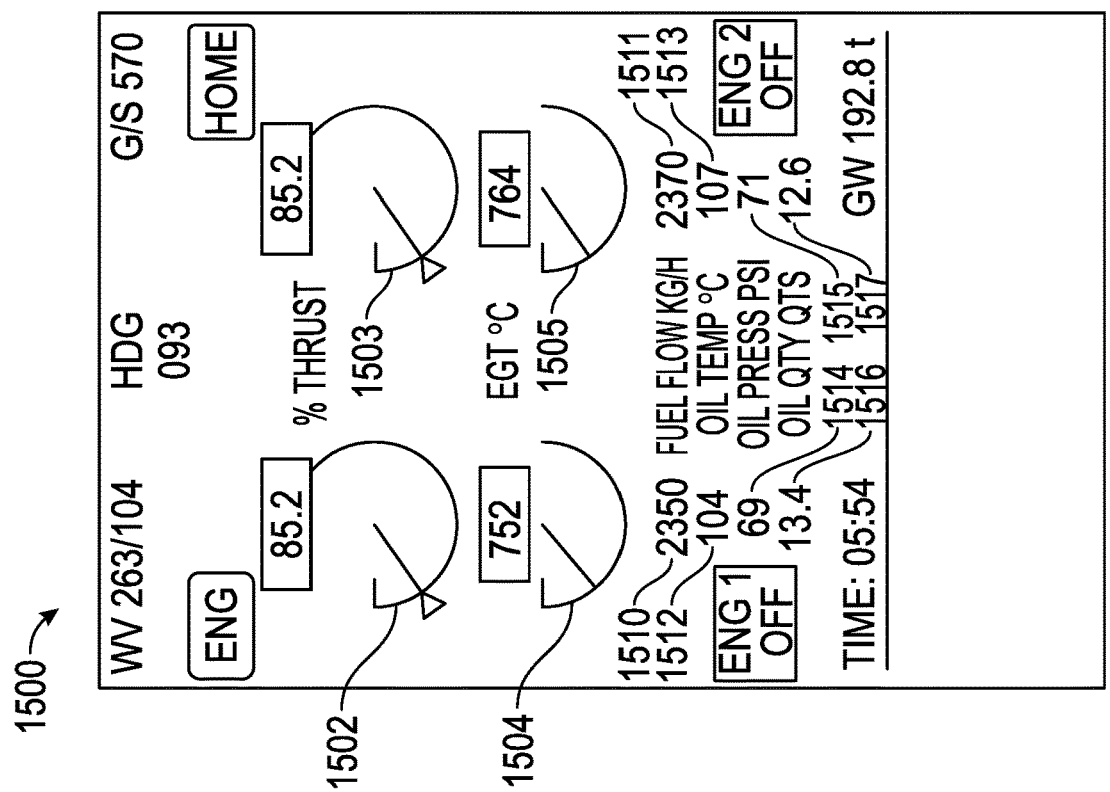
FIG. 15 depicts an embodiment of an engine GUI.

Referring to FIG. 15, an embodiment of an engine GUI 1500 is depicted. The engine GUI 1500 may be displayed in response to selection of the engine button 516. A set of thrust controls 1502, 1503 may enable a user to control a thrust associated with multiple engines of a simulated aircraft. A set of mixture controls 1504, 1505 may enable a user to change a fuel mixture to result in a desired exhaust gas temperature level. The engine GUI 1500 may further include fuel flow indicators 1510, 1511, oil temperature indicators 1512, 1513, oil pressure indicators 1514, 1515, and oil quantity indicators 1516, 1517.

Figure 16:
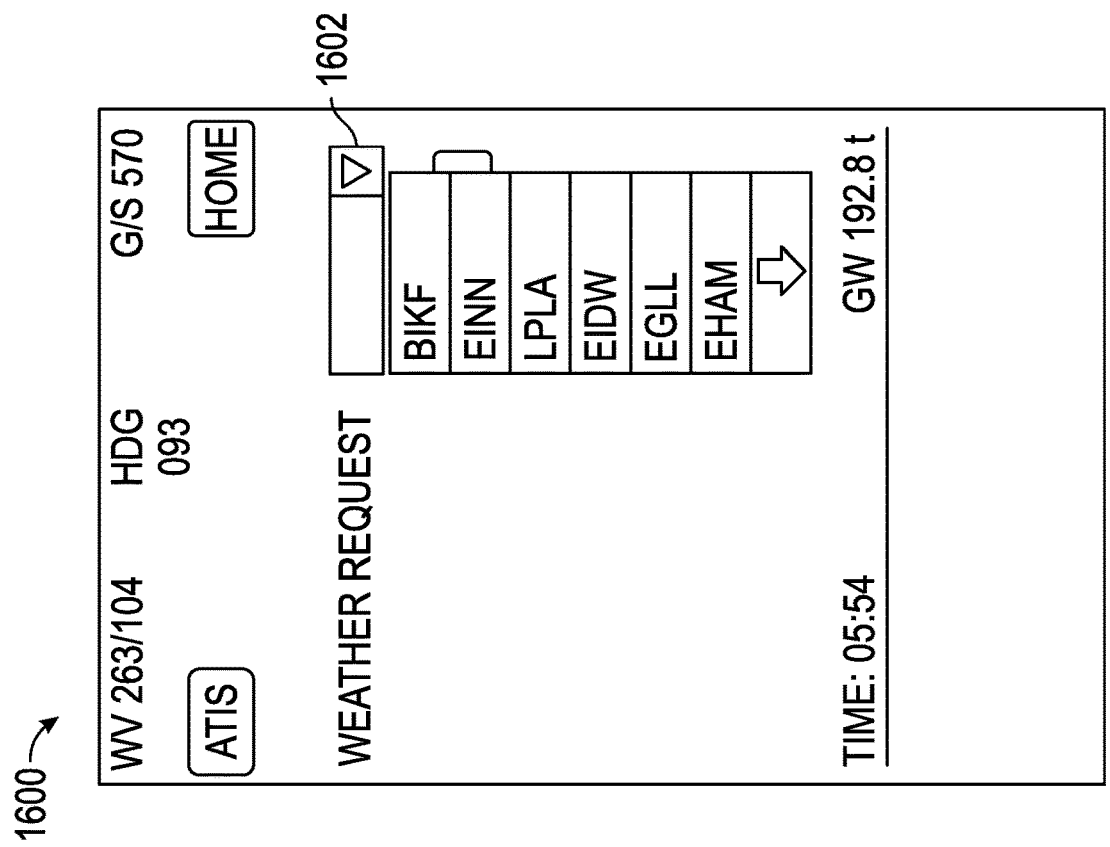
FIG. 16 depicts an embodiment of an automatic terminal information service (ATIS) GUI.

Referring to FIG. 16, an embodiment of an ATIS GUI 1600 is depicted. The ATIS GUI 1600 may be displayed in response to selection of the ATIS button 520. The ATIS GUI 1600 may include at least one airport dropdown button 1602.

Referring to FIG. 17, an embodiment of a weather report GUI 1700 is depicted. The weather report GUI 1700 may be displayed over, or on top of, the ATIS GUI 1600 in response to selection of an airport through the airport dropdown button 1602. A weather indicator 1702 may provide information such as wind velocity, visibility, cloud coverage, runway condition, and other warnings associated with a particular airport.

Referring to FIG. 18, an embodiment of an airport GUI 1800 is depicted. The airport GUI 1800 may be displayed in response to selecting of the airport button 522 and may include a listing 1802 of nearby airports along with distances to the airport, estimated times of arrival, and other information associated with the airports.

Referring to FIG. 19, an embodiment of a landing performance GUI 1900 is depicted. The landing performance GUI 1900 may be depicted in response to selection of the landing performance button 524. The landing performance GUI 1900 may enable input regarding factors that may affect a landing. Referring to FIG. 20, an embodiment of a results display GUI 2000 is depicted. The results display GUI 2000 may be displayed over, or on top of, the landing performance GUI 1900 in response to completion of a simulated landing. The results display GUI 2000 may provide information to enable evaluation of the landing and may note any considerations that may improve future performance.

Figure 21:
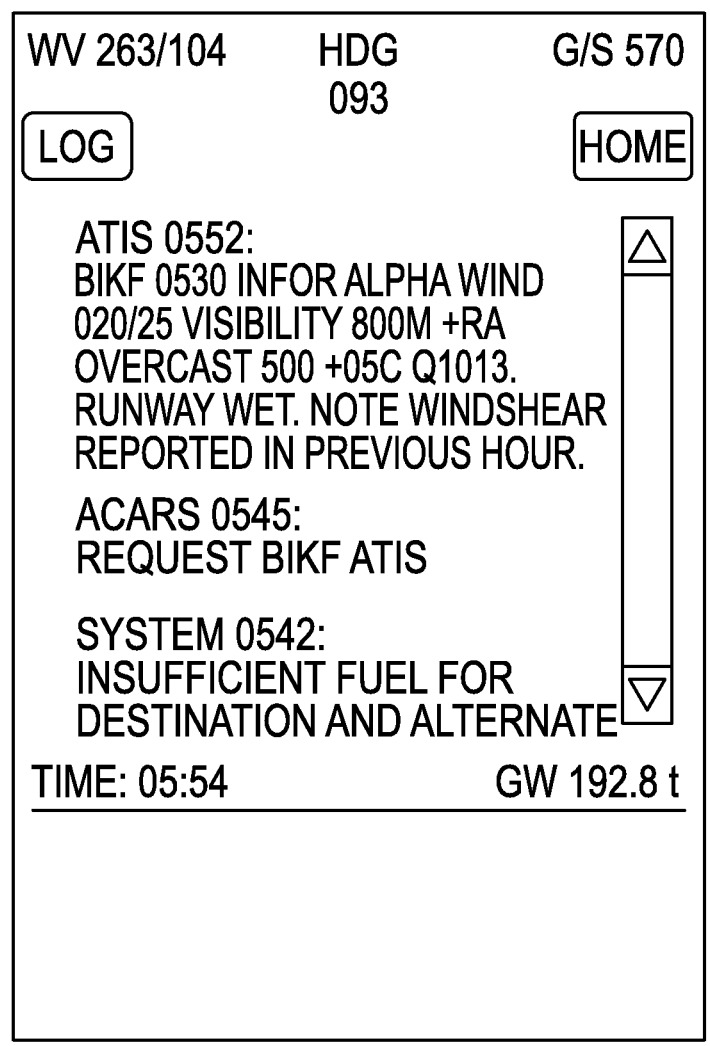
FIG. 21 depicts an embodiment of a log GUI.

Referring to FIG. 21, an embodiment of a log GUI 2100 is depicted. The log GUI 2100 may be displayed in response to selection of the log button 526 and may include a summary of user interactions with the set of GUIs depicted in FIGS. 5-21.

Figure 22:
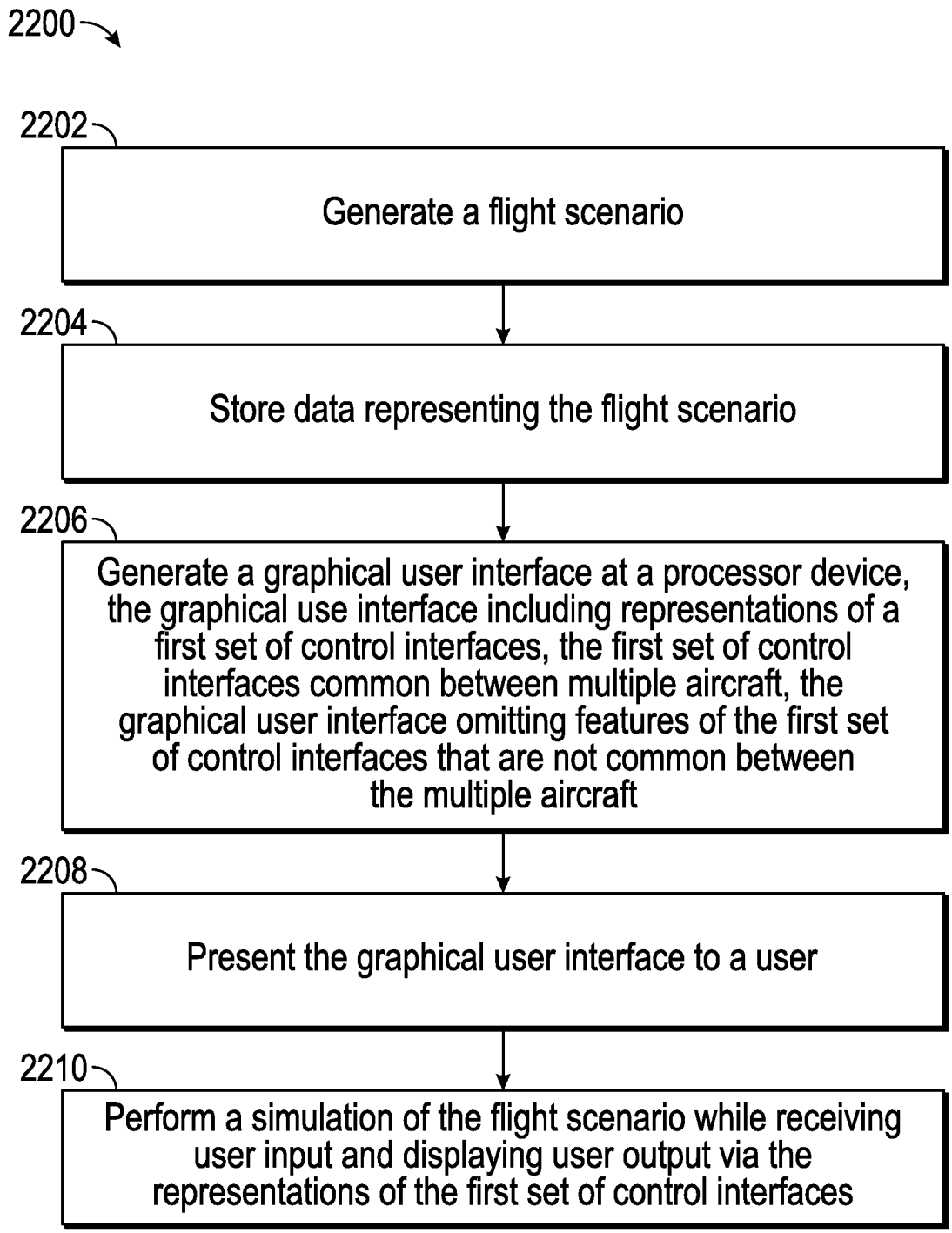
FIG. 22 is a flow chart depicting an embodiment of a method for mid-fidelity simulation.

Referring to FIG. 22, an embodiment of a method 2200 for mid-fidelity simulation is depicted. The method 2200 may include generating a flight scenario, at 2202. For example, the flight scenario 122 may be generated based on the in-flight event 124 and/or the flight scenario parameters 130.

The method 2204 may further include storing data representing the flight scenario, at 2204. For example, the flight scenario 122 may be stored at the memory 120.

The method 2206 may also include generating a GUI at a processor device, at 2206. The GUI may include representations of a first set of control interfaces, the first set of control interfaces common between multiple aircraft. The GUI may omit features of the first set of control interfaces that are not common between the multiple aircraft. As an example, the GUI 142 may be generated and may include the set of common control interfaces 144.

The method 2208 may include presenting the graphical user interface to a user, at 2208. For example, the GUI 142 may be presented using the display device 140.

The method 2210 may further include performing a simulation of the flight scenario while receiving user input and displaying user output via the representations of the first set of control interfaces, at 2210. For example, the simulation 112 may be performed while receiving the user input 150 and displaying the user output 152.

Although various embodiments have been shown and described, the present disclosure is not so limited and will be understood to include all such modifications and variations as would be apparent to one skilled in the art.

What is claimed is:

1. A system for mid-fidelity simulation comprising:
   a memory configured to store data representing a flight scenario, the flight scenario applicable to a first aircraft and a second aircraft, wherein the first aircraft and the second aircraft have common control interfaces, being common between the first aircraft and the second aircraft, and distinct control interfaces, being unique to the first aircraft or the second aircraft;
   a display device configured to present a graphical user interface to a user, wherein the graphical user interface includes representations of the common control interfaces, and wherein the graphical user interface omits the distinct control interfaces that are unique to the first aircraft or the second aircraft; and
   a processor configured to perform a simulation of the flight scenario while receiving user input and displaying user output via the representations of the common control interfaces.

2. The system of claim 1, wherein the flight scenario includes at least one in-flight event.

3. The system of claim 2, wherein the at least one in-flight event includes an aircraft operation event, wherein the aircraft operation event includes smoke or fire in a cabin of an aircraft, smoke or fire in a cargo hold of the aircraft, depressurization in the cabin of the aircraft, a low fuel warning, a weather advisory warning, or a combination thereof.

4. The system of claim 2, wherein the at least one in-flight event includes a script-based event, wherein the script-based event includes a medical diversion scenario, an unruly passenger scenario, a cabin technical problem scenario, a turbulence scenario, or a combination thereof.

5. The system of claim 1, wherein the processor is further configured to:
   monitor the user input during the simulation of the flight scenario; and
   compare the user input to a comparative standard user input, wherein the display device is configured to present a checklist to the user when the user input does not satisfy the comparative standard user input.

6. The system of claim 5, wherein the processor is further configured to modify one or more parameters of the flight scenario based on the user input during the simulation of the flight scenario for future simulations.

7. The system of claim 1, wherein the processor is further configured to:
   determine a state of the simulation after the simulation is completed; and
   compare the state of the simulation to a comparative standard state, wherein the display device is configured to present a checklist to the user when the state of the simulation does not satisfy the comparative standard state.

8. The system of claim 7, wherein the processor is further configured to modify one or more parameters of the flight scenario based on the state of the simulation after the simulation is completed for future simulations.

9. The system of claim 1, wherein the processor is further configured to determine a training level, wherein the common control interfaces are associated with the training level.

10. The system of claim 1, wherein the memory is further configured to store feedback data regarding the simulation, the feedback data indicating a number of clicks to resolve a problem, time taken to resolve the problem, number of control interfaces explored, or a combination thereof.

11. A method for mid-fidelity simulation comprising:
generating a graphical user interface at a processor device, the graphical user interface including representations of a first set of control interfaces, wherein the set of control interfaces is aircraft-agnostic to multiple aircraft such that the set of control interfaces is common between the multiple aircraft and the graphical user interface omitting features of the first set of control interfaces omits any control interfaces that are not common between the multiple aircraft; and
performing a simulation of a flight scenario while receiving user input and displaying user output via the representations of the set of control interfaces.

12. The method of claim 11, wherein the set of control interfaces are color coded, having at least a first color denoting control interfaces that are user accessible and at least a second color denoting data calculated during the simulation.

13. The method of claim 11, wherein the first set of control interfaces includes a flight management system, a navigation system, a fuel management system, a flight control system, an engine system, or a combination thereof.

14. The method of claim 11, wherein the flight scenario includes at least one in-flight event wherein the set of control interfaces are associated with the at least one in-flight event.

15. The method of claim 11, further comprising determining a training level, wherein the first set of control interfaces is associated with the training level.

16. The method of claim 11, wherein the set of control interfaces include features that are not common between the multiple aircraft, wherein the features include positions of the set of control interfaces on a flight deck, shapes of the set of control interfaces, sizes of the set of control interfaces, or a combination thereof.

17. The method of claim 11, wherein the set of control interfaces includes a flight management system selectable button, a navigation system selectable button, a fuel management system selectable button, a flight control system selectable button, and an engine system selectable button.

18. A method for mid-fidelity simulation comprising:
generating a flight scenario applicable to a first aircraft and a second aircraft, wherein the first aircraft and the second aircraft include a set of common control interfaces that are common between the first aircraft and the second aircraft and a set of distinct control interfaces that are unique to the first aircraft or the second aircraft;
generating a graphical user interface that includes representations of the set of common control interfaces, wherein the graphical user interface includes representations of only the set of common control interfaces, excluding the set of distinct control interfaces; and
performing a simulation of the flight scenario while receiving user input and displaying user output via the representations of the set of common control interfaces.

19. The method of claim 18, wherein generating the flight scenario comprises iteratively performing the simulation and modifying parameters based on feedback data.

20. The method of claim 18, wherein the set of common control interfaces includes a flight management system selectable button, a navigation system selectable button, a fuel management system selectable button, a flight control system selectable button, an engine system selectable button, or a combination thereof.

* * * * *

UNITED STATES PATENT AND TRADEMARK OFFICE
CERTIFICATE OF CORRECTION

| | |
|---|---|
| PATENT NO. | : 11,216,146 B2 |
| APPLICATION NO. | : 16/275723 |
| DATED | : January 4, 2022 |
| INVENTOR(S) | : Cameron et al. |

It is certified that error appears in the above-identified patent and that said Letters Patent is hereby corrected as shown below:

In the Claims

Claim 11 should read:
11. A method for mid-fidelity simulation comprising:
generating a graphical user interface at a processor device, the graphical user interface including representations of a set of control interfaces, wherein the set of control interfaces is aircraft-agnostic to multiple aircraft such that the set of control interfaces is common between the multiple aircraft and the set of control interfaces omits any control interfaces that are not common between the multiple aircraft; and
performing a simulation of a flight scenario while receiving user input and displaying user output via the representations of the set of control interfaces.

Claim 14 should read:
14. The method of claim 11, wherein the set of control interfaces includes a flight management system, a navigation system, a fuel management system, a flight control system, an engine system, or a combination thereof.

Claim 16 should read:
16. The method of claim 11, further comprising determining a training level, wherein the set of control interfaces is associated with the training level.

Signed and Sealed this
Twenty-fourth Day of May, 2022

Katherine Kelly Vidal
*Director of the United States Patent and Trademark Office*